(12) United States Patent
Ignatov et al.

(10) Patent No.: US 6,563,640 B1
(45) Date of Patent: May 13, 2003

(54) DICHROIC POLARIZER AND METHOD FOR MAKING THE SAME

(75) Inventors: Leonid Y. Ignatov, Moscow (RU); Yuri A. Bobrov, Moscow (RU); Pavel I. Lazarev, Belmont, CA (US)

(73) Assignee: Optiva, Inc., South San Francisco, CA (US)

( * ) Notice: Subject to any disclaimer, the term of this patent is extended or adjusted under 35 U.S.C. 154(b) by 0 days.

(21) Appl. No.: 09/720,227

(22) PCT Filed: Oct. 26, 1999

(86) PCT No.: PCT/RU99/00400

§ 371 (c)(1),
(2), (4) Date: Apr. 2, 2001

(87) PCT Pub. No.: WO00/25155

PCT Pub. Date: May 4, 2000

(30) Foreign Application Priority Data

Oct. 28, 1998 (RU) .......................................... 98119452

(51) Int. Cl.[7] .............................................. G02B 27/28
(52) U.S. Cl. ...................... 359/491; 359/490; 359/492; 359/500; 359/900; 349/194; 252/525
(58) Field of Search ................................ 359/352, 490, 359/491, 492, 483, 485, 500, 900; 349/194; 252/525

(56) References Cited

U.S. PATENT DOCUMENTS

| | | | | |
|---|---|---|---|---|
| 4,133,775 A | * | 1/1979 | Bloom ........................ | 252/585 |
| 5,301,045 A | * | 4/1994 | Miller et al. ................ | 349/115 |
| 5,751,389 A | * | 5/1998 | Andreatta et al. ............ | 349/97 |
| 5,925,289 A | * | 7/1999 | Cael et al. ................... | 252/585 |
| 6,049,428 A | * | 4/2000 | Khan et al. .................. | 359/491 |

FOREIGN PATENT DOCUMENTS

| | | |
|---|---|---|
| EP | 0 198 082 | 7/1992 |
| GB | 2162790 | 2/1986 |
| SU | 1778731 | 11/1992 |
| WO | WO 94/28073 | 12/1994 |
| WO | WO 97/21123 | 6/1997 |

OTHER PUBLICATIONS

Goldfarb, D., et al., "Orientational Order in the Lyomesophases of the Disodiumchromoglycate–Water System by $^2$D, $^{17}$O and $^{23}$Na NMR", *Mol. Cryst. Liq. Cryst.*, vol. 87 (1982), pp. 259–279.

* cited by examiner

*Primary Examiner*—John Juba, Jr.
(74) *Attorney, Agent, or Firm*—Dorsey & Whitney LLP

(57) ABSTRACT

The present invention relates to heat-resistant and plarizers that use thin films of dichroic organic substances, mainly dichroic dyes applied on the surface of rigid or flexible substrates in which the molecules of the dichroic organic substance are arranged in the form of a crystalline grid. The purpose of this invention is to widen the spectral range of the polarizer operation while improving polarization characteristics. This dichroic polarizer includes a film having a portion at least consisting of a crystalline structure that comprises at least one dichroic organic substance, wherein the molecules or molecule fragments of this substance have a planar morphology. The dichroic substance consists of a dichroic substance having at least one crest on the spectral absorption curve within spectral ranges of 400 to 700 nm and/or 200 to 400 nm and 0.7 to 13 $\mu$m. The order parameter of the film S is defined by the formula $S=(D_\perp-D_\parallel)/(D_\perp+2D_\parallel)$ in which $D_\perp$ and $D_\parallel$ represent the optical density measured in the polarized light during the perpendicular and parallel orientations, respectively, of the polarizer polarization axis relative to the polarization plane of an electromagnetic radiation from a spectrometer. This parameter corresponds to at least one crest on the spectral absorption curve within a spectral range of 0.7 to 13 $\mu$m, and has a value not less than 0.8.

22 Claims, No Drawings

DICHROIC POLARIZER AND METHOD FOR MAKING THE SAME

FIELD OF THE INVENTION

The invention belongs to the class of thermostable and lightfast dichroic polarizers manufactured using thin films of dichroic organic substances, in particular, the organic dyes in which molecules of a dichroic organic substance are ordered in a crystalline lattice and which are deposited onto either a rigid or a flexible substrate surface.

The proposed dichroic polarizers may be used under crude production and operation conditions: in the automobile industry for the triplex windscreen glass production, in illuminating equipment, in the architectural and construction glass manufacture. They may also be used in the liquid-crystal (LC) displays operating at high temperatures and illumination intensity levels.

BACKGROUND OF THE INVENTION

In GB 2162790A, issued Feb. 12, 1986, a dichroic polarizer is described which is an organic polymer-substance film containing a dichroic substance and having a crystalline lattice with the single-axis orientation coefficient no less than 70%. The dichroic-substance fraction in the polarizing film is 0.1–0.2% while the polarizer thickness is 40–170 microns. The large polarizer thickness, however, limits the field of its application. In particular, because of the large thickness, it can not be used as the internal polarizer in LC indicators. Moreover, the polarizer of this type, being effective in the visible spectrum range, can not provide high dichroism in the infrared spectrum region because the molecule planes of the dichroic substance are not oriented with respect to each other.

A dichroic-polarizer analogous to the one proposed is described in PCT WO 94/28073, published Dec. 8, 1994. This polarizer is a film containing no less than 70% of at least one dichroic organic substance with the planar-structure molecules (or molecule fragments). The molecules form orientation-ordered ensembles in which the molecule planes, as well as optical-transition dipole moments lying in these planes, are oriented perpendicularly, or almost perpendicularly, to the axis of the polarizing film macroscopic orientation.

The drawback of such a dichroic polarizer lies in the fact of presence of linear threadlike particles characterized by low correlation between the dipole moment orientation in the, molecules belonging to different linear particles. This does not allow improvement of the polarizer optical characteristics. Moreover, because of these particles, sufficient homogeneity can not be provided on the entire polarizer-film surface during manufacturing.

A method of dichroic polarizer manufacturing analogous to the proposed technique is also described in PCT WO 94/28073, published Dec. 8, 1994. In this method, the LC solution of an organic dye is deposited onto the substrate surface, is oriented, and then dried at 20–80° C.

The disadvantage of this method is that it does not provide sufficiently high extent of organic dye molecule orientation and, therefore, does not allow to essentially improve the polarizer optical characteristics.

SUMMARY OF THE INVENTION

The present invention improves the polarizer operation characteristics. The present invention the spectral range of the polarizer operation and simultaneously improves the polarizer's polarizing characteristics.

The present invention provides a dichroic polarizer containing a film which contains at least one dichroic organic substance, the molecules or molecule fragments of the said substance having planar structures, wherein at least part of the film has a crystalline structure, at least one of the said dichroic substances is a dichroic substance with at least one maximum in its spectral absorption curve in each of the spectral ranges, 400–700 nm and/or 200–400 nm, and 0.7–13 microns, and the order parameter S has a value no less than 0.8, the said parameter corresponding to at least one maximum on the spectral absorption curve in the 0.7–13 micron spectral range and being determined according to the formula $$S=(D_\perp-D_\parallel)/(D_\perp+2D_\parallel),$$

where $D_\perp$ and $D_\parallel$ are optical densities in the polarized light for, respectively, perpendicular and parallel orientation of the polarization plane of the polarizer with respect to the polarization plane of incident electromagnetic radiation.

DESCRIPTION OF THE INVENTION

The dichroic polarizer includes a film containing at least one dichroic organic substance, the molecules or molecule fragments of the said substance having planar structures, wherein at least part of the film has a crystalline structure. At least one of the said dichroic substances is a dichroic substance with at least one maximum in its spectral absorption curve in each of the spectral ranges, 400–700 nm and/or 200–400 nm, and 0.7–13 microns. The order parameter S has a value no less than 0.8, the said parameter corresponding to at least one maximum on the spectral absorption curve in the 0.7–13 micron spectral range and being determined according to the formula $$S=(D_\perp-D_\parallel)/(D_\perp+2D_\parallel),$$

where $D_\perp$ and $D_\parallel$ are optical densities in the polarized light for, respectively, perpendicular and parallel orientation of the polarization plane of the polarizer with respect to the polarization plane of the spectrometer electromagnetic radiation.

In some cases, the order parameter is no less than 0.85. In some other cases, the order parameter has the value no less than 0.88.

When the planes of all molecules are exactly parallel to each other, the polarizer's polarization axis is perpendicular to the molecule planes. However, since scatter is in fact almost always present in the angle parameters of the molecule plane orientation, the polarization axis direction can be determined as the direction corresponding to the maximum intensity of the electromagnetic radiation flux passed through the film. This maximum intensity practically coincides with the maximum transmission coefficient determined when rotating the polarization plane of the linearly polarized electromagnetic radiation falling onto the film perpendicularly to the film surface. When the polarization axis is determined in this manner, it is not necessary to allow for the scatter in the orientation angles of dipole moments of separate molecules. The <<polarization axis>> term is used below in this particular sense.

The polarizer may not absorb in the visible spectral range. In this case, the order parameter is no less than 0.6 for the wavelength of at least one maximum of the spectral absorption curve in the 200–400 nm spectral range. In some cases, the order parameter is no less than 0.75.

The order parameter is no less than 0.8 for the wavelength for at least one maximum of the spectral absorption curve in the 400–700 nm spectral range. In some cases, the order parameter is no less than 0.85.

The crystal structure of at least a part of the film is a three-dimensional crystalline lattice formed by the molecules of at least one dichroic organic substance. Under optimal manufacturing conditions, the crystal structure of the entire film surface can be obtained. If deposition is imperfect, at least a part of the film has crystalline structure. Perfection of the crystal structure can be experimentally estimated using the electron-diffraction patterns (B. K. Vainstein, *The x-ray diffraction on chain molecules* Moscow: USSR Academy of Sciences Press, 1963, p.310). For the proposed polarizers, the crystal structure of at least part of the said film is a three-dimensional crystalline lattice formed by molecules of at least one dichroic organic substance, the angular diffusion of the meridional reflection is no more than 18°, the said diffusion being determined from the diffraction pattern of the said film for the electron beam incidence being normal to the polarizer surface.

The crystalline lattice can have triclinic, monoclinic, or rhombic symmetry. The crystalline lattice parameter b determined from the diffraction pattern is 3.2 to 3.7 Å in the direction parallel to that of the polarization axis. In some cases, the crystalline lattice parameter b determined from the said diffraction pattern is 6.4 to 7.4 Å in the direction parallel to that of the polarization axis b, the 6.4 to 7.4 Å values being double the molecule thickness.

The organic-substance film thickness may be 0.1 to 3.0 microns. Most preferably, the organic-substance film thickness should be 0.2 to 2.0 microns.

As the dichroic organic substances, organic substances may be used which have the absorption spectrum band maxima in the following regions: 400–700 nm (the visible region) and/or 200–400 nm (the near ultraviolet region), and, also, 0.7–13 microns (the near and the intermediate infrared region). The organic substance may be chosen from the class of fluorescent bleaches having the absorption band maxima in the ranges of 0.7–13 microns and 200–400 nm (however, some other substances can be used as well):

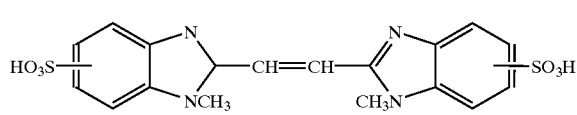

(Venkataraman, K., *The Chemistry of Synthetic Dyes* New York: Academic Press, 1952, Vol. 6, p.394), Also, other colorless organic substance, viz. sodium chromoglycate, can be used (Goldfarb, D., Labes, M. M., Luz, Z., Pourko, R., Mol. Cryst., 87, p.259 (1982) for the above-mentioned purpose.

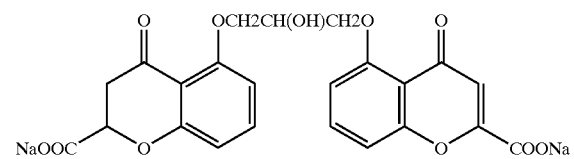

Dichroic organic substances need to be used absorbing in the 400–700 nm region and, simultaneously, in the regions of 200–400 nm and 0.7–13 microns. The dichroic organic substance may be chosen from the class of azo dyes, for example, the "direct diazo-yellow lightfast" dye (B. I. Stepanov, *Introduction into the organic dye chemistry* Moscow: <<Chemistry>>, 1984, p.355):

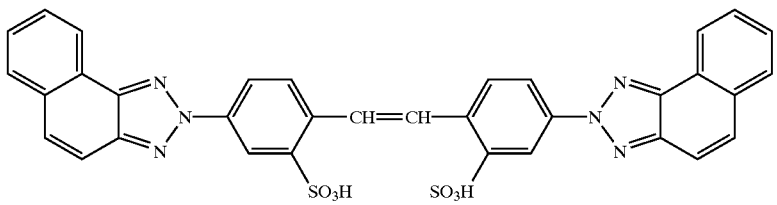

(B. I. Stepanov, *Introduction into the organic dye chemistry* Moscow: Chemistry, 1984, p. 549 or

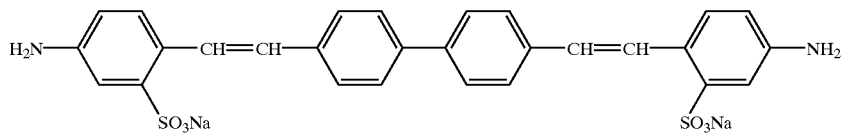

(Venkataraman, K., *The Chemistry of Synthetic Dyes* New York: Academic Press, 1952, Vol. 6, p.341), or

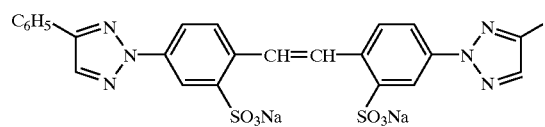
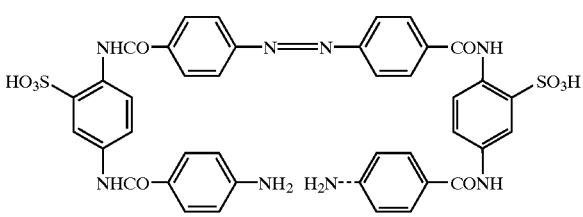

(Venkataraman, K., *The Chemistry of Synthetic Dyes* New York: Academic Press, 1952, Vol. 6, p.355), or or benzopurpurin 4B (B. I. Stepanov, *Introduction into the organic dye chemistry* Moscow: <<Chemistry>>, 1984, p.397):

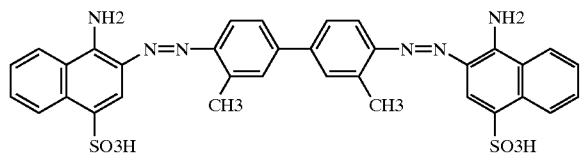

The dichroic organic substance may also be chosen from the class of polycyclic dyes. In particular, the polycyclic dye is chosen from the sulfonation products of indanthrone (B. I. Stepanov, *Introduction into the organic dye chemistry* Moscow: <<Chemistry>>, 1984, p.485):

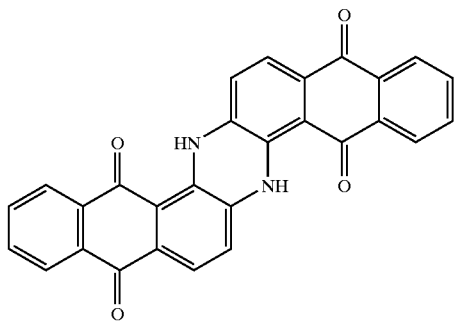

or of the <<Vat Dark Green G>> dye (B. I. Stepanov, *Introduction into the organic dye chemistry* Moscow: <<Chemistry>>, 1984, p.252):

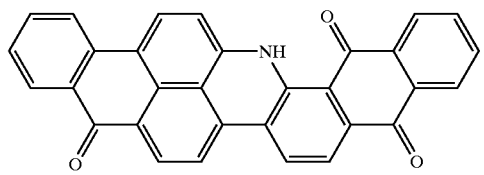

or of the <<Vat Scarlet 2G>> dye (a mixture of cis- and trans-isomers as well as separated isomers) (B. I. Stepanov, *Introduction into the organic dye chemistry* Moscow: <<Chemistry>>, 1984, p.512):

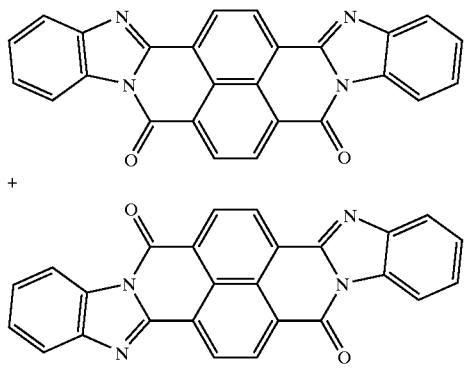

or of quinacridone (B. I. Stepanov, *Introduction into the organic dye chemistry*. Moscow: <<Chemistry>>, 1984, p.197:

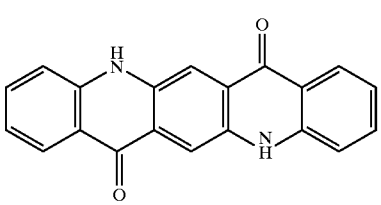

or of the dibenzoimidazole derivative of perylenetetracarboxylic acid (bis-benzoimidazo[2,1-a:1'2'-b']anthra[2,1,9-def:6,5,10-d'e'f']diisoguinoline-6,11-dione) (B. I. Stepanov, *Introduction into the organic dye chemistry*. Moscow: <<Chemistry>>, 1984, p.518, dye No. 52) (a mixture of cis- and trans-isomers):

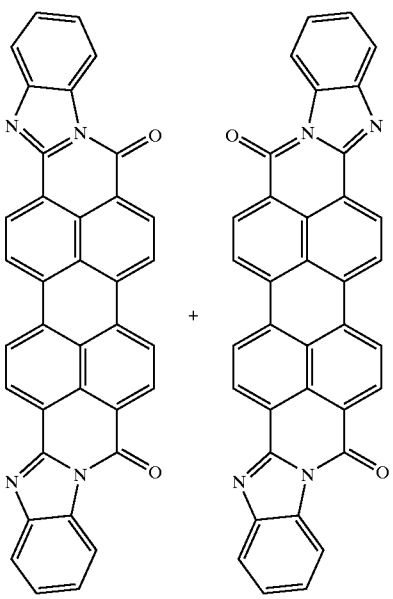

The organic substance may also be a mixture of products of sulfonation of indanthrone, the Vat Scarlet 2G dye, and the dibenzoimidazole derivative of perylene tetracarboxylic acid.

The sulfonation products can be used is the form of free sulfonic acids as well as in the form of the salts with mono-valent cations, in particular, the alkaline-metal cations or the ammonium cation. The mentioned dichroic organic substances form liquid crystals in 4–30% solutions. The LC solution of the indicated concentration can be made when the dry substance is dissolved in the solvent at 20–100° C. and then cooled down to room temperature.

The technical result is achieved by applying a manufacturing technique for a dichroic polarizer including deposition of a film onto a substrate surface, the said film containing at least one dichroic organic substance with the molecules or molecule fragments of the said substance having planar structures, application of an orienting force to the said film, and drying, wherein conditions of the film deposition, the type and magnitude of the orienting force are chosen so as the order parameter for at least one maximum of absorption in the 0.7–13 micron spectral range, would have the value of no less than 0.8. In some cases, the film is deposited by spreading the liquid crystalline solution of the said dichroic organic substance onto the surface of the substrate, and dried at temperatures between 0° C. and 20° C. and relative humidities between 70% and 80%. In some other cases, the said film of the liquid crystalline solution of the said dichroic organic substance is dried at temperatures between 5° C. and 15° C. and relative humidities between 75% and 80%. The orienting force may be applied simultaneously with depositing the liquid crystalline solution film.

Absorption ability of the dichroic organic substances with the planar-structure molecules (or molecule fragments) is determined by vibrations taking place in the molecule plane. For example, the planar bending vibration C=C—H determines the maximum of the absorption spectrum curve at 1282–1286 cm$^{-1}$ (7.78–7.80 microns). The absorption dichroism, however, can be observed only when the planes of the organic-substance molecules are spatially ordered. It is the crystalline structure that has the highest molecule ordering extent among all phase states. The organic-substance molecules, however, usually have low symmetry which corresponds to the point group of the lowest category. Therefore, the symmetry group of the crystalline lattice in which the organic-substance molecules can be ordered may belong to one the following lowest-syngony types: triclinic, monoclinic, or rhombic. Separate molecules become the crystalline-lattice structural units, instead of the linear ensembles which <<disappear>> (rearrange) during crystallization when the proposed technique is embodied. Due to presence of such crystalline lattice, the polarizer film has a more homogeneous structure. Apart from the crystalline ordering, the molecule plane orientation parallel to at least one of the crystallographic axis and, accordingly, parallel to each other, should be ensured to provide high polarizing ability of the polarizer. If this is achieved, dichroism is observed in the infrared region. Then, as the deviation of the molecule planes from parallelism decreases, the order parameter for the infrared region becomes higher. The mentioned feature allows to manufacture high-quality dichroic polarizers to be used in the intermediate infrared region. On the other hand, when the extent of the molecule plane ordering is high, the scatter in the angular values of the dipole moments of the electronic transitions in the molecules of the dichroic organic substance decreases. This results in improvement of the polarizing characteristics in other spectral ranges. Thus, the polarizer can have high dichroism simultaneously in the visible spectral region of 400–700 nm and/or in the near ultra violet region of 200–400 nm.

The parallel packing of the substance molecules is experimentally confirmed by the reflections in the electron-diffraction pattern which correspond to the interplane distance equal to the thickness (or the doubled thickness) of the molecule (about 3.2–3.7 Å or, respectively, 6.4–7.4 Å).

When the proposed polarizers are manufactured as the crystalline-ordered films of organic substances, the polarizer thickness necessary for providing the optimal polarizer optical characteristics is usually 0.1–3.0 microns (in some cases it is 0.2–2.0 microns). These thickness ranges improve the polarizer operation characteristics, in particular, the vision angles when using the polarizers in the LC displays.

The above-described crystalline-ordered thin organic-substance film can be manufactured using a number of techniques in which the film of a dichroic organic substance is deposited onto the substrate and then oriented. These techniques may include the following processes:

crystallization from the solution on the substrate surface or during vacuum distillation. During crystallization, the organic substance can be oriented using the electromagnetic field or the anisotropy of the substrate on which crystallization is performed;

electrolytic precipitation of the organic anionic substance on the anisotropic substrate surface acting as the anode;

mechanical orientation of the LC solution of the organic substance performed on the substrate surface and subsequent drying under the conditions causing ordered crystallization of the organic substance.

Other techniques can also be used.

The essential point is that the conditions of film deposition should be selected. In other words, one has to select the dichroic organic substance, the deposition technique, the solution concentration, the state of the substrate surface, the drying mode, etc. It is also necessary to select the type and extent of orienting so that the order parameter corresponding to at least one absorption maximum in the spectral range of 0.7–13 microns is no less than 0.8 (it may be necessary to choose, for example, between the electric or the magnetic field, or to choose the mechanical orienting technique, etc.). Then, the molecules of the dichroic organic substance may be packed in the crystalline lattice and the diffusion of the meridional reflection determined from the electron-diffraction pattern should not exceed 18°.

As we experimentally determined, in the case of mechanical orientation of the LC solution of the dichroic organic substance performed on the substrate surface, when the drying rate is decreased (that means that the drying temperature is decreased down to 0–20° C. when the relative air humidity is 70–80%, and to 5–15° C. when the humidity is 75–80%), the angular diffusion of the parameters of the molecule plane orientation decreases, while the perfection of the crystalline lattice and its homogeneity on the forming polarizer surface becomes higher.

The fact that the substance, being in the form of the LC solution, is originally in the high-order state contributes, along with the drying rate decrease, to ordered crystallization. As mentioned above, the highly ordered linear ensembles, in which the organic-substance molecule planes are approximately perpendicular to the ensemble axis, are the structural units of such LC solutions. When the LC solution of the dichroic organic substance is mechanically oriented on the substrate surface, the molecule ensembles become ordered along the orientation direction with the molecules being mainly oriented perpendicularly to the orientation direction. Therefore, incorporation of the organic-substance molecules into the crystalline lattice proceeds easier during the subsequent dye evaporation from the LC solution. Then, instead of the linear ensembles "disappearing" during crystallization, separate molecules of the substance become the structural units of the crystalline lattice.

The proposed polarizer can be manufactured using a rigid planar, spherical, or cylindrical surface, either transparent or reflecting. In particular, the inorganic glass, semiconducting materials, or metallic surfaces can be used. If the polarizer is formed on the surface of the optically transparent polymer film (polyethyleneterephthalate, polymethylacrylate, triacetyl cellulose, etc.), the polarizers can be made flexible. To make the polarizers water-insoluble, one should treat them with the solutions of bi- or tri-valent metal salts. The polarizer crystal structure and its characteristics do not change during this procedure.

The protecting transparent lacquer or glue layer can be deposited over the obtained polarizing coating (PC). Using this layer, the polarizer can be glued to any surface.

The above-presented points are illustrated in the following examples.

EXAMPLE 1

The indanthrone sulfonation product (8.5 g) purified from inorganic salts, Triton-X-100 (0.2 g), PEG 3000 (0.5 g), and distilled water (90.8 g) are placed into a flask, stirred at 70° C. during one hour until the dye completely dissolves, and then cooled down to room temperature. The obtained LC solution (0.5 ml) is deposited in the form of a strip onto a 10×10 cm glass plate (the strip is deposited 2 cm from the plate edge). The plate is fixed on a rectilinearly moving table. The pressure of a nonrotating roller 2 cm in diameter is applied to the plate. Thickness of the forming dye-solution layer is set with two spacers fixed on the roller with 8 cm distance between them. The table with the fixed plate is moved with 10 cm/sec velocity. The film is dried at 6–8° C. under the relative humidity of 75–80%. Thickness of the obtained dye film was determined by the interference method using the <<Interfako>> interference microscope (Karl Zeiss) and was found to be 0.35 microns.

The polarization transmission spectra of thin crystalline-ordered dye films were recorded using the "Hitachi EPS-033" spectrophotometer equipped with a polarizer. The iodine film polarizer having 99.9% polarizing efficiency with 40% transmission was used as the polarizer. The optical absorption of the single polarizer was measured when the polarization axis of the tested polarizer was oriented along ($D_\perp$) and perpendicularly ($D_\parallel$) to the plane of the spectrophotometer radiation polarization. The substrate sample was inserted into the reference window. The order parameter S was calculated when the maximum of the absorption spectrum curve was at 650 nm:

$$S=(D_\perp-D_\parallel)/(D_\perp+2D_\parallel)$$

For the described polarizer, the obtained value of S equaled 0.885.

The infrared spectra were recorded in the region of 500–5000 $cm^{-1}$ using the Mixelson 100 spectrometer (Bomen) with 4 $cm^{-1}$ resolution at room atmosphere. The spectra were recorded using the transmission method for the normal radiation incidence onto the dye film surface. The $CaF_2$ plates were used as the substrates. A pure $CaF_2$ plate was used as the reference one. The absorption (i.e. the optical density) D of the sample was calculated using the formula $D=-1\ g(T_1/T_0)$ where $T_1$ was the transmission of the sample with the dye and $T_0$ was the transmission of the corresponding reference sample without the dye. To record the spectra of the film samples, a special device containing a tilting platform to which the sample holder was rigidly fixed was inserted into the spectrometer channel. The design of this special device allowed to place the substrate with the deposited dye film perpendicularly to the infrared ray axis and then to rotate the sample in this plane around the ray axis to the given angle. The error in the deflection angle determination did not exceed 0.5°. The dye film polarization measurements were performed using the standard infrared polarizer made in the form of the Al lattice on the KRS5 window; the extent of the radiation polarization was no worse than 0.98. For the band having maximum at 1282–1284 $cm^{-1}$ which corresponds to the CCH-group bending vibrations in the dye molecules, the measured value of the order parameter was 0.890; when transformation into the water-insoluble Ba form was performed, the S value was found to be 0.887.

The electron-diffraction patterns of the dichroic organic substances were recorded with averaging over 4 or 5 samples using the MIR-12 electron microscope and the modernized MF-2 microphotometer. To prepare the samples, the dye film, in the form of plates, was detached in methylbenzene from the substrate surface. These plates were then taken out with the supporting frames preliminarily etched in nitric acid and washed with acetone and distilled water. The films were then fixed with carbon in vacuum.

The identity periods corresponding to the diffraction maxima in the electron-diffraction patterns were determined using the $TlCl_3$ calibration curve (the minor periods) and calculated from the Bragg expression taking into account the wavelength value (0.0418 Å) and the object-photographic plate distance (803 mm) (the major periods). The optical-diffraction pattern (the result of the optical transformation of the electron-diffraction pattern) indicates that the regular system of the planes exists, with those planes equidistant along the axis coinciding with the polarization axis. From the electron-diffraction pattern geometry (the three-dimensional case was analyzed) in the framework of monoclinic syngony, the following crystalline-lattice parameters were found: a=22 Å, b=6.7 Å, c=34 Å, $\alpha=\gamma=90°$, $\beta=120°$, spatial group $P2_1/c$. The angular spreading of the meridional reflection was 16.1°.

EXAMPLES 2–10

The measured parameters of the dichroic polarizers manufactured in accordance with the proposed invention are presented in Table 1.

TABLE 1

| Example No. | Dichroic substance | Polariser thickness (microns) | Order parameter Infrared region (7.8 microns) | Order parameter Visible region ($\lambda_{max}$) | Order parameter Ultraviolet region ($\lambda_{max}$) | Diffusion of meridional reflection, degrees |
|---|---|---|---|---|---|---|
| 1 | Sulfonated Indanthrone | 0.35 | 0.90 | 645 nm 0.887 | 320 nm 0.70 | 15.8 |
| 2 | Sulfonated Vat Scarlet 2G | 0.7 | 0.885 | 470 nm 0.864 | 345 nm 0.72 | 16.1 |
| 3 | Mixture of sulfonated dyes: Indanthrone, Vat Scaret 2G, Vat Perylene Violet | 1.2 | 0.94 | 550 nm 0.864 | 325 nm 0.65 | 11.6 |
| 4 | Optical bleach IV | 2.0 | 0.875 | | 365 nm 0.86 | 16.8 |
| 5 | Direct diazo-yellow lightfast O | 0.3 | 0.89 | 405 nm 0.88 | 350 nm 0.856 | 15.8 |
| 6 | Mixture of sulfonic derivatives of Indanthrone and Direct diazo-yellow lightfast O | 1.0 | 0.88 | 650 nm 0.86 | 350 nm 0.85 | 16.4 |

As can be seen from the presented characteristics, the polarizers made accordingly to the proposed invention in the form of a thin crystalline-ordered film of a dichroic organic substance provide widening of the spectral range of the polarizer operation as well as high polarizing teristics.

What is claimed is:

1. A dichroic polarizer containing a film, the said film being formed from at least one dichroic organic substance, the molecules or molecule fragments of the said substance having planar structures, wherein at least part of said substance has a crystalline structure, at least one of the said dichroic substances is a dichroic substance with at least one maximum in its spectral absorption curve in each of the spectral ranges of 400–700 nm, 200–400 nm, and 0.7–13 microns, or at least one maximum in its spectral absorption curve in each of the spectral ranges of 200–400 nm and 0.7–13 microns, and the order parameter S has a value no less than 0.8, the said parameter corresponding to at least one maximum on the spectral absorption curve in the 0.7–13 micron spectral range and being determined according to the formula $$S=(D_\perp-D_\parallel)/(D_\perp+2D_\parallel)$$

where $D_\perp$ and $D_\parallel$ are optical densities in the polarized light for, respectively, perpendicular and parallel orientation of the polarization plane of the polarizer with respect to the polarization plane of incident electromagnetic radiation.

2. A dichroic polarizer of claim 1, wherein the order parameter has the value no less than 0.88.

3. A dichroic polarizer of any of claims 1 or 2, wherein the crystal structure of at least part of the said film is a three-dimensional crystalline lattice formed by molecules of at least one dichroic organic substance, the angular spreading of the meridional reflection is no more than 18°, the said spreading being determined from the diffraction pattern of the said film for the electron beam incidence being normal to the polarizer surface.

4. A dichroic polarizer of claim 3, wherein the crystalline lattice parameter b determined from the said diffraction pattern is 3.2 to 3.7 Å in the direction parallel to that of the polarization axis.

5. A dichroic polarizer of claim 3, wherein the crystalline lattice parameter b determined from the said diffraction pattern is 6.4 to 7.4 Å in the direction parallel to that of the polarization axis.

6. A dichroic polarizer of claim 1, wherein the organic-substance film thickness is in the range of 0.1 to 3.0 microns.

7. A dichroic polarizer of claim 6, wherein the organic-substance film thickness is in the range from 0.2 to 2.0 microns.

8. A dichroic polarizer of claim 1, wherein the order parameter is no less than 0.6 for the wavelength of at least one maximum of the spectral absorption curve in the 200–400 nm spectral range.

9. A dichroic polarizer of claim 8, wherein the order parameter in the 200–400 nm spectral range is no less than 0.75.

10. A dichroic polarizer of claim 8, wherein the said organic substance is chosen from the class of fluorescent bleaches.

11. A dichroic polarizer of claim 8, wherein the order parameter in the 200–400 nm spectral range is no less than 0.85.

12. A dichroic polarizer of claim 8, wherein the order parameter is no less than 0.8 for the wavelength of at least one maximum of the spectral absorption curve in the 400–700 nm spectral range.

13. A dichroic polarizer of claim 12, wherein the dichroic organic substance is chosen from the class of azo dyes.

14. A dichroic polarizer of claim 12, wherein the dichroic organic substance is chosen from the class of polycyclic dyes.

15. A dichroic polarizer of claim 14, wherein the polycyclic dye is chosen from the sulfonation products of indanthrone, or of the Vat dark green G dye, or of the Vat Scarlet 2G dye, or of quinacridone, or of the dibenzoimidazole derivative of perylene tetracarboxylic acid.

16. A dichroic polarizer of claim 14, wherein the organic substance is a mixture of products of sulfonation of indanthrone, the Vat Scarlet 2G dye, and the dibenzoimidazole derivative of perylene tetracarboxylic acid.

17. The dichroic polarizer of claim 1 wherein the said film is treated with the solutions of bi- or tri-valent metal salts to make the polarizer insoluble.

18. A manufacturing technique for a dichroic polarizer including deposition of a layer of a liquid crystalline solution onto a substrate surface, the said layer containing at least one dichroic organic substance with the molecules or molecule fragments of the said substance having planar structures, application of an orienting force to the said layer, and drying, wherein conditions of the layer deposition, the type and magnitude of the orienting force are chosen so as the order parameter for at least one maximum of absorption in the 0.7–13 micron spectral range, has the value of no less than 0.8.

19. A manufacturing technique of claim 18, wherein the said layer is deposited by spreading the liquid crystalline solution of the said dichroic organic substance onto the surface of the substrate, and dried at temperatures between 0° C. and 20° C. and relative humidities between 70% and 80%.

20. A manufacturing technique of claim 18, wherein the said layer of the liquid crystalline solution of the said dichroic organic substance is dried at temperatures between 5° C. and 15° C. and relative humidities between 75% and 80%.

21. A manufacturing technique of claims 19 or 20, wherein the orienting force is applied simultaneously with depositing the liquid crystalline solution layer.

22. The manufacturing technique of claim 18 wherein the said layer of the liquid crystalline solution of the said dichroic organic substance is treated with the solutions of bi- or tri-valent metal salts to make the polarizer water-insoluble.

* * * * *